Figure 1:
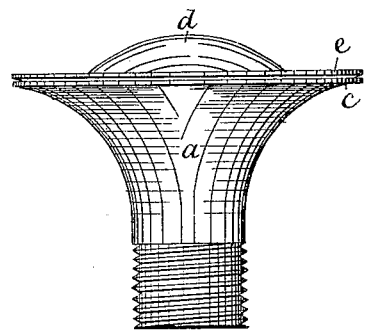

(Model.)

F. W. WHITING.
AUTOMATIC FIRE EXTINGUISHER.

No. 249,813. Patented Nov. 22, 1881.

Witnesses.
L. F. Connor.
Arthur Reynolds.

Inventor:
Francis W. Whiting
by Crosby & Gregory Attys

UNITED STATES PATENT OFFICE.

FRANCIS W. WHITING, OF CHELSEA, MASSACHUSETTS.

AUTOMATIC FIRE-EXTINGUISHER.

SPECIFICATION forming part of Letters Patent No. 249,813, dated November 22, 1881.

Application filed April 7, 1881. (Model.)

*To all whom it may concern:*

Be it known that I, FRANCIS W. WHITING, of Chelsea, county of Suffolk, State of Massachusetts, have invented an Improvement in Automatic Fire-Extinguishers, of which the following description, in connection with the accompanying drawings, is a specification.

My invention relates to that class of fire-extinguishers in which permanent conducting-pipes are arranged to convey water or other liquid to the point or points to be protected, and the fluid is automatically released from roses or distributers by the action of the heat of a fire upon a fusible alloy or solder by which the said distributers normally remain sealed.

In the distributers of this class heretofore in use the fusible alloy has been placed in contact with the body of metal of the distributer or pipe, and in some instances the cover has been fastened as a sleeve about the neck of the distributer, the solder then being in the form of a cylindrical film wrapped about the distributer-neck. When disposed in this manner the temperature of a considerable mass of metal has to be raised before the solder is fused, and much valuable time in the incipient stages of a fire is lost. An extinguisher has also been made in which the soldering portion is separated from the main portion by an annular recess; but the cover fits over as a tube or sleeve, so that much friction is developed in removing the said cover, even after the solder is softened so as to no longer resist the said movement by its cohesion, and the apparatus is consequently uncertain and slow in operation.

My invention consists in providing the distributer and its cover with soldering-flanges extended from the main body of the metal in the form of a thin annular sheet, the solder being interposed between these flanges, which are so nearly independent of the main body of the distributer that the latter can conduct but little heat from them, and being very thin they are heated almost as quickly as the surrounding atmosphere, and the solder is melted much sooner than in distributers of ordinary construction. By this construction the line of movement of the cover from the distributer is nearly at right angles to the film of solder, so that no force except the actual strength or cohesion and adhesion of the solder resists the removal of the said cover, which consequently takes place as soon as the solder softens or grows sufficiently weak. The cover which keeps the water back corresponds in shape with and is fitted closely upon the distributer, thus covering its orifices for discharge, no space being left between the cover and distributer. This is done to keep the impurities of the water or sediment away from the operating portion of the distributer. A cover or washer of flexible material is placed between the corresponding surfaces of cover and distributer, it lying wholly within the soldering-flanges and operating to keep the water back until the fusible metal shall have completely softened.

Figure 2:
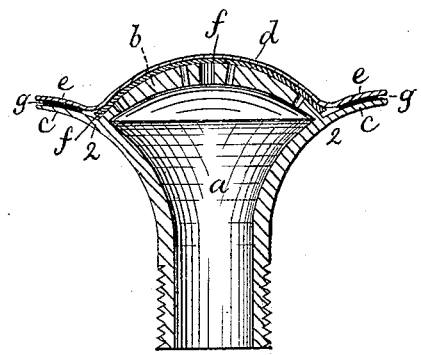
Figure 3:
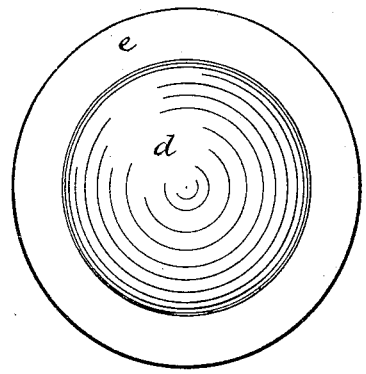
Figure 4:
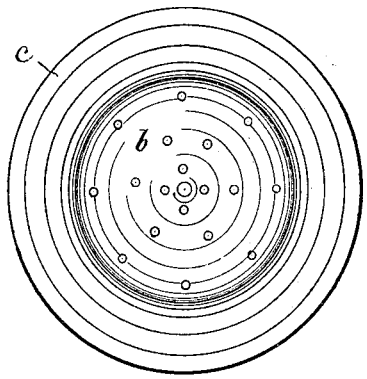

Figure 1 is a side elevation of my improved distributer; Fig. 2, a longitudinal section thereof, and Figs. 3 and 4 top views thereof with the cover on and removed respectively.

The distributer *a* is shown as of cast metal of any suitable shape, it having a convex perforated distributing portion, *b*, and a thin soldering-flange, *c*, extended out in continuation of the lower imperforated part of the distributer.

The cover *d*, which may be struck up or of spun metal, is preferably shaped to correspond with the outer surface of the distributing portion *b* of the distributer, and has a flange portion, *e*, made to correspond with the soldering-flange *c* of the distributer *a*, so that when the cover is placed upon the top of the distributer it coincides closely therewith, and no space is left between them.

In sealing up the distributers to make them ready to be attached to the water-pipes in the building to be protected, a thin washer, *f*, of rubber or other suitable yielding material, is placed between the distributing portion *b* and the cover *d*, and the fusible solder is run in between the flanges *c e*, as shown at *g*, Fig. 2. The washer *f* closes tightly the orifice of the distributer as long as the cover *d* lies above it, so that it is not until the solder is softened sufficiently to entirely release the said cover that the water begins to flow, and it then flows forcibly through the unobstructed orifices, while with the ordinary distributers where the water is retained only by the cover, if the solder softens at one point it will let the water leak through and thus cool it, and delay the release of the cover or cap and the free forcible issue of the water.

The distributer is preferably placed with its axis vertical and the soldering-flange consequently horizontal, so that it will be exposed to the action of rising currents of heated air and more quickly affected thereby.

Placing the solder $g$ in soldering-flanges, as shown, enables the inclosing metal to be directly affected by heat on both sides of the said solder, and the said metal, being very thin, is very sensitive to the action of heat, which can be conducted away from the said flanges to the body of metal of the distributer $a$ only through the small area at 2, remote from the solder $g$, while in distributers of ordinary construction the said metal lies in direct contact with the solder, and the whole mass and inclosed water has to have its temperature considerably raised by conduction from or through the said solder from the outside before the said solder will melt.

I have herein described a distributer in which the cap fits closely over the perforated portion, and have also shown and described a seal or washer properly located to prevent the water from reaching the soldered joint between the said distributer and cap; but I do not broadly claim such construction.

I claim—

1. The combination, with a distributer, of a cap covering the distributer and secured by fusible solder to a flange, the solder-jointed surface of the cap and flange being inclined to the axis of the distributer, whereby the cap is enabled to immediately separate from the flange on the softening of the solder.

2. The distributer provided with a perforated portion, and cover fitted to coincide therewith, combined with the washer $f$, interposed between the said cover and distributer, whereby the perforations are maintained tightly closed until the cover is entirely released, when the water is permitted to issue with full force, substantially as described.

In testimony whereof I have signed my name to this specification in the presence of two subscribing witnesses.

FRANCIS W. WHITING.

Witnesses:
JOS. P. LIVERMORE,
ARTHUR REYNOLDS.